US012130368B2

(12) United States Patent
Gomez et al.

(10) Patent No.: US 12,130,368 B2
(45) Date of Patent: Oct. 29, 2024

(54) SATELLITE SIGNAL PROPAGATION DELAY TEST DEVICE

(71) Applicant: VIAVI SOLUTIONS INC., Chandler, AZ (US)

(72) Inventors: Joseph Gomez, Boyds, MD (US); David Royle, Rockville, MD (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 332 days.

(21) Appl. No.: 17/884,412

(22) Filed: Aug. 9, 2022

(65) Prior Publication Data

US 2023/0056803 A1    Feb. 23, 2023

Related U.S. Application Data

(60) Provisional application No. 63/232,396, filed on Aug. 12, 2021.

(51) Int. Cl.
*G01S 19/23*    (2010.01)
(52) U.S. Cl.
CPC .................................. *G01S 19/23* (2013.01)

(58) Field of Classification Search
CPC ............. G01S 19/14; G01S 19/23–235; G01S 19/256; G01S 19/37; G01S 19/11
See application file for complete search history.

(56) References Cited

U.S. PATENT DOCUMENTS

| 4,879,700 A | * | 11/1989 | MacIntyre | .............. | G04F 10/00 |
| | | | | | 968/844 |
| 2018/0102863 A1 | * | 4/2018 | Royle | .................... | G01R 25/00 |

FOREIGN PATENT DOCUMENTS

JP       2015206639 A    * 11/2015

* cited by examiner

*Primary Examiner* — Cassi J Galt
(74) *Attorney, Agent, or Firm* — Mannava & Kang, P.C.

(57) ABSTRACT

A test device determines a Global Navigation Satellite System (GNSS) signal propagation delay in a GNSS signal distribution system (GSDS) for a radio access network. The test device includes a GNSS receiver and a clock. The GNSS receiver is connected at different times to a reference GSDS with a known signal propagation delay and to a device under test (DUT), including a second GSDS having an unknown signal propagation delay. One pulse per second (1PPS) signals are generated by the GNSS receiver and are compared to determine the unknown signal propagation delay of the DUT.

20 Claims, 9 Drawing Sheets

Points of Delay between GNSS antenna 130 and GNSS receiver 121

SATELLITE SIGNAL PROPAGATION DELAY TEST DEVICE

BACKGROUND

A Fifth Generation (5G) mobile standard, referred to as New Radio (NR), calls for higher data transfer speeds, greater numbers of connections, and better coverage, among other improvements. Standardization is ongoing in the 3rd Generation Partnership Project (3GPP), and is anticipated to be in multiple stages. Stage 1 for 5G NR was completed by 3GPP, and is set forth as 3GPP Technical Report (TR) 21.915 v15.0.0 (2019 September), "Technical Specification Group Services and System Aspects (Release 15)." The 5G standard, according to 3GPP, may provide downlink data rates of up to 50 Megabits per second (Mbps) outdoors and up to 1 Gigabit per second (Gbps) indoors. Consequently, increased spectral efficiency, increased signaling efficiencies, and lower latency should be expected when compared to the 3GPP Fourth Generation (4G) standard. An overview of Long Term Evolution (LTE), also known as LTE Release 8, is provided by 3GPP, "Overview of 3GPP Release 8," v0.3.3 (2014 September). Likewise, 4G has evolved from the 3GPP Third Generation (3G) standard. An overview of 3G is provided by 3GPP, "Overview of 3GPP Release 99," v.1.0 (TP-030275) (2003 December). A Radio Access Network (RAN) or a Radio Access Technology (RAT) may be 3G, 4G, 5G, or a combination thereof.

A Global Navigation Satellite System (GNSS) is a satellite constellation that provides Positioning, Navigation, and Timing (PNT) services on a global or regional basis. Example GNSS receiver systems include: the Global Positioning System (GPS), a North American satellite-based radionavigation system owned by the United States government and operated by the United States Space Force; the globalnaya navigatsionnaya sputnikovaya sistema, also known as the "Global Navigation Satellite System" (GLONASS), a global radionavigation satellite service provided by the Russian Federal Space Agency; the BeiDou Navigation Satellite System (BUS), operated by the China National Space Administration, and Galileo, operated by the European Global Navigation Satellite Systems Agency. A GNSS receiver may calculate and output a One Pulse Per Second (1PPS) signal to provide timing for control of a 3G, 4G, or 5G RAN. Once received, a 1PPS signal may be communicated within a RAN by coaxial cable (coax), also known as Radio Frequency (RF) cable, or optical fiber (fiber).

A fronthaul network or fronthaul is generally a mobile network portion deployed between an antenna and a central office. In other words, fronthaul is the fiber-based connection in RAN infrastructure between a Baseband Unit (BBU) and a Remote Radio Head (RRH). For some applications, it may be useful to obtain greater precision in timing control for a RAN fronthaul network. For example, 5G applications directed to the Internet of Things (IoT) may require ultra-low latency (i.e., speeds measured in hundreds of nanoseconds or less), and be directed to emerging technologies such as autonomous vehicles, smart city traffic management, drone deployments, and connected wearable/mobile devices.

BRIEF DESCRIPTION OF THE DRAWINGS

Features of the present disclosure are illustrated by way of examples shown in the following figures. In the following figures, like numerals indicate like elements, in which.

DETAILED DESCRIPTION

Figure 1:
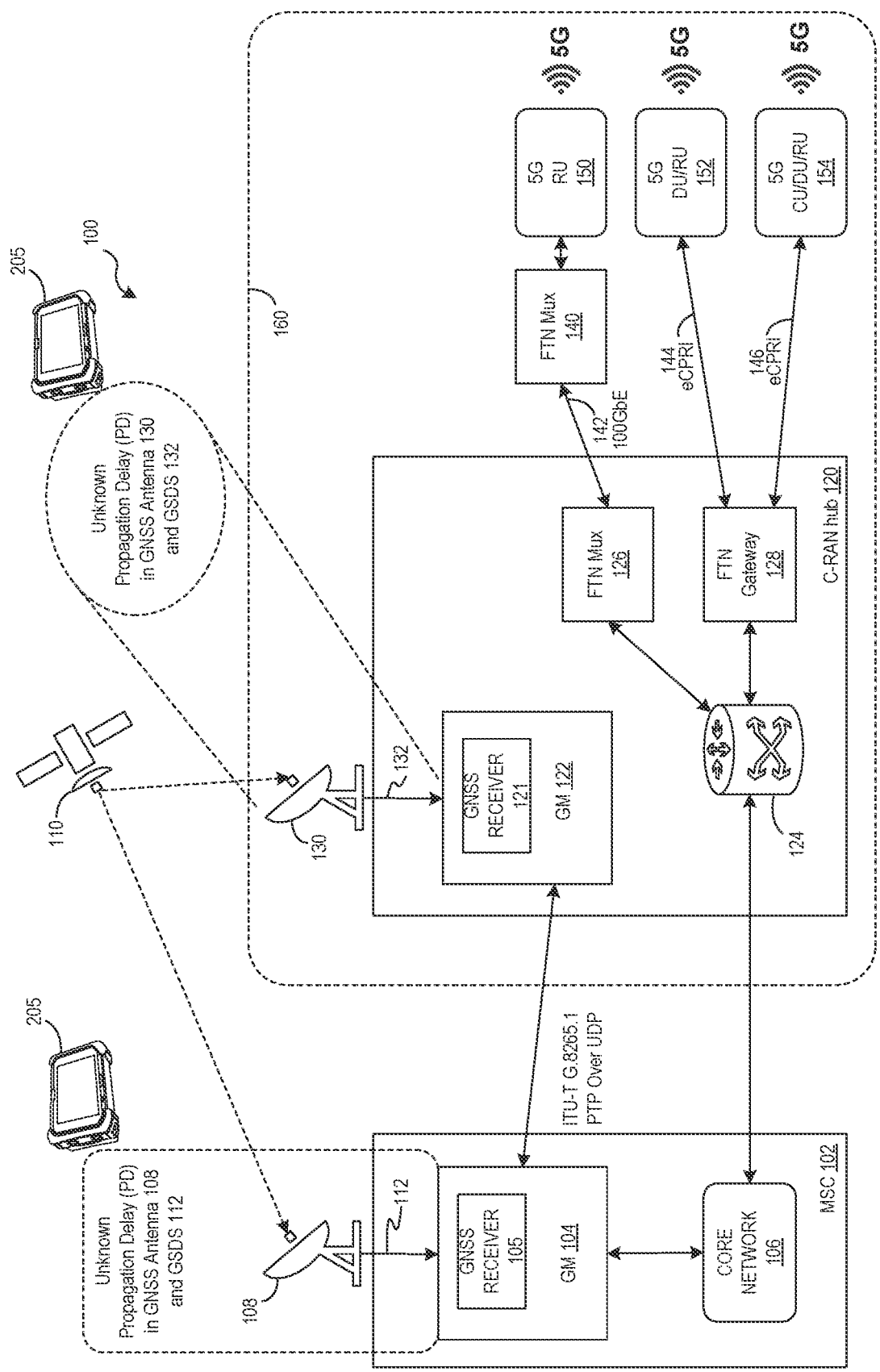
FIG. 1 is a block diagram of a 5G RAN illustrating a timing architecture, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on. Also, GNSS is a generic name for a group of artificial satellites that send position and timing data from their high orbits. GPS is just one of the many different sets of satellites that can provide such data. In some instances herein, GPS and GNSS are used interchangeably. For example, the term "GPS over Fiber" may refer to "GNSS over Fiber," and the like.

In a GNSS system, each satellite has an atomic clock, accurate to one second in 300 million years, which is synchronized to a master atomic clock located at an Earth base station. GNSS satellites transmit radio signals providing satellite position and timing information. For example, a GPS satellite transmits four signals for civilian use, known as L1 C/A (1575.42 megahertz (MHz)), L2C (1227.60 MHz), L5 (1176 MHz), and L1C (1575 MHz). Data is transmitted using binary phase-shift keying (BPSK) and code division multiple access (CDMA). Ranging codes and navigation messages are modulated onto the carrier wave. A GNSS receiver receives GNSS signals, including embedded time information based on the atomic clock from a GNSS satellite. The GNSS receiver decodes the received GNSS signals to determine the embedded time information and calculates and outputs a corresponding 1PPS signal based on the embedded time information. The 1PPS signal is synchronized to Coordinated Universal Time (UTC). As is further discussed below, the 1PPS signal may be used to synchronize clocks across a network.

There are generally two timing protocols that may utilize a 1PPS signal, Network Time Protocol (NTP) and Precision Time Protocol (PTP). NTP is a networking protocol for clock synchronization between computer systems over packet-switched, variable-latency data networks. NTP is an open source project coordinated by the Network Time Foundation and is intended to synchronize participating computers to within a few milliseconds of UTC. UTC is defined by International Telecommunication Union (ITU) Recommendation (ITU-R) for Time signals and frequency standards emissions (TF) TF.460-6, "Standard-frequency and time-signal emissions," (1970-2002) (incorporated by reference into ITU Radio Regulations), and is based on International Atomic Time (TAI) with leap seconds added at irregular intervals to compensate for the slowing of the Earth's rotation. NTP is generally used to synchronize system clocks in general-purpose Unix, Windows, and Virtual Machine (VM) workstations and servers that require less precision that PTP.

PTP is defined by the Institute of Electrical and Electronics Engineers (IEEE) 1588 Precision Time Protocol, version 2, IEEE, March 2008, and updated as IEEE 1588-2019, IEEE, November 2019, PTP is generally used to synchronize device clocks in special-purpose measurement networks, such as RANs. A PTP system may include clocks in a master-slave configuration, with a root timing reference device referred to as a grandmaster clock. PTP devices may be connected to dedicated, high-speed Ethernet Local Area Network segments interconnected by switches. PTP messages may use a protocol known as User Datagram Protocol (UDP) over Internet Protocol (IP) for transport. PTP messages may be sent unicast or multicast.

A Grandmaster clock (GM), also known as a Grandmaster, Edge Grandmaster, or an Edge Grandmaster Clock, is a primary reference source of time within a PTP sub-domain, such as a RAN architecture. The GM is essential for providing standard time information to other clocks across the network, such as in PTP messages. A GM receives UTC-based time information from an external time reference, such as a GNSS satellite. The GM derives precision time from the GNSS signals. The GM then distributes the precision time to other clocks in the network. The GM may have a high-precision time source, which may be synchronized to a 1PPS signal output from a GNSS receiver of the GM to generate a GM clock signal. The GM outputs PTP messages to a connected network so devices in the connected network can synchronize to the GM clock signal. A Boundary Clock (BC) may also be present in a RAN architecture. A BC may be considered a slave clock, run PTP, and be synchronized to the GM with PTP messages. Hence, accurate PTP messages output by the GM propagate through the network and rely upon precision of the 1PPS signal calculated and output from the GNSS receiver.

GMs may be installed at a Centralized RAN (C-RAN) hub location to cost optimize GNSS & timing/sync for PTP applications. C-RAN, also known as Cloud RAN, is a centralized, cloud computing-based architecture for RANs deploying 3G, 4G, and 5G wireless communication standards. As an example, a C-RAN hub location may be a basement in a stadium with various cell phone antennas surrounding the stadium. The C-RAN hub relies upon PTP messages from the GM for timing control.

Synchronous Ethernet (SyncE) is an International Telecommunication Union Telecommunication Standardization Sector (ITU-T) standard for computer networking that facilitates the transference of clock signals over an Ethernet physical layer. SyncE ITU-T standards include: ITU-T G.8261/Y.1361, "Timing and synchronization aspects in packet networks," (August 2019), specifying architecture and wander performance; G.8262.1/Y.1362.1, "Packet over Transport aspects—Synchronization, quality and availability targets," (January 2019) specifying Synchronous Ethernet clocks for SyncE; and ITU-T G.8264/Y.1364, "Packet over Transport aspects—Synchronization, quality and availability targets," (August 2017) specifying an Ethernet Synchronization Messaging Channel (ESMC). PTP and SyncE protocols may be used to share time with connected devices. Accuracy of a PTP message or a SyncE clock signal may be traceable to and rely upon the GM, which in turn relies upon the 1PPS signal output from a GNSS receiver.

Deployment of GMs at C-RAN hub locations may reduce costs by reducing a need for installation of GNSS antennas and receiver systems at each 5G Remote Unit (RU). An RU may also be referred to as a remote radio head (RRH) or remote radio unit (RRU). There is also an installation burden and risk associated with permanent installation of GNSS antennas due to their traditional deployment on roof tops and other elevated locations. Moreover, deployment of GMs at C-RAN hub locations may reduce the costs associated with supplying GNSS antennas and receiver systems to every 5G Distributed Unit (DU), Centralized Unit (CU), or Baseband Unit (BBU), including cabling installation, maintenance, etc. Providing more stringent PTP time error requirements for GM synchronization may leverage existing Ethernet cabling, such as dark fiber, to execute PTP and SyncE. Accordingly, increasing the precision of a 1PPS signal received by a GM provides increased benefits through a connected RAN.

GNSS signals are received by a GNSS antenna, propagate through a GNSS signal distribution system (GSDS), and are received by a GNSS receiver, which then decodes, calculates, and outputs a corresponding 1PPS signal. The GNSS receiver calculates position and UTC time, at the point in time the GNSS signals are received by the GNSS antenna. Due to propagation delay (PD) inherent in the GNSS antenna and the GSDS, the 1PPS signal output by the GNSS receiver (and the corresponding calculated time) is slightly behind UTC. Accordingly, the 1PPS signal output by the GNSS receiver is slightly behind UTC, and contributes to a loss in timing precision through a RAN.

According to an example, GMs may be programmed with a configurable delay offset, also known as a GM offset, to account for PD through a GNSS antenna and GSDS. Often times, a GM may not be programmed with GM offset at the time of installation. At other times, a GM may only be programmed with an estimated GM offset corresponding to an estimated delay based upon cable length. For example, length of a coax cable segment may be known during installation or may be calculated using a time-domain reflectometer (TDR). Likewise, length of a fiber cable segment may be known during installation or may be calculated using an optical time-domain reflectometer (OTDR). Based on known transmission delay per predetermined length of cable for coax or fiber, an estimate of transmission delay can be calculated over the coax or fiber can be calculated if the length of the installed cable is known. However, such estimated delays fail to consider in-line element delays caused by in-line active or passive RF elements, such as splitters, surge arrestors, or other devices. Also, cables, once installed, are often routed through structures and the length of the cable may not be readily measured. Moreover, TDR and OTDR may not provide delays associated with in-line elements.

In view of the above, the accuracy of many installed GM offsets may be currently unknown and may not be properly programmed to address 5G PTP time error requirements. Moreover, current practices may not properly account for holistic PD from a GNSS antenna to a GM because communication between a GNSS antenna and a GM may travel through a GSDS having various configurations. For example, a GSDS may simply be coax with an unknown installed cable length. In an example, the GSDS may include, in addition to physical cables, various passive or active elements that may be disposed in-line along a GSDS communication path, such as splitters, repeaters, and surge arrestors. Moreover, the GSDS may transition from coax to fiber by, for example, a GPS over Fiber interface, i.e. (GPSoF) interface, a GPSoF roof box, and a GPSoF hub box.

In an example, the GSDS includes multiple elements in a communication path, such as a coax connected to a GNSS antenna, and passes through a surge arrestor, transitions to fiber with a GPSoF roof box, propagates through fiber (such as a Single Mode (SM) fiber), and transitions back to coax with a GPSoF hub box before being received by a GM. According to an example, a GSDS may have a coax communication path on the order of 100 feet, but of course that coax may be any length as needed. A GSDS utilizing a GPSoF communication path may be greater and extend over 20 miles by way of example. A GPSoF roof box and/or hub box may include one or more GPSoF converters, also known as GPSoF interfaces or optical transceiver modules. According to an example, an optical transceiver module may be a Small Form-factor Pluggable (SFP) transceiver or a Quad Small Form-factor Pluggable (QSFP) transceiver under control of a device including a processor. A SFP or QSFP is a compact, hot-pluggable network interface module used for both telecommunication and data communications applications. The form factor and electrical interface are specified by a Multi-Source Agreement (MSA) set by the Small Form Factor Committee. SFP and QSFP transceivers support Synchronous Optical Networking (SONET), Gigabit Ethernet (GbE), Fiber Channel, passive optical network (PON), and other communications standards.

According to an example, a GM may be compliant as a time/frequency reference with ITU-T G.8272, "Timing characteristics of primary reference time clocks," (October 1012, November 2018, and March 2020) for phase and time synchronization; and ITU-T G.811, "Timing characteristics of primary reference clocks," (September 1997 and April 2016). According to an example, a GM may be considered a Primary Reference Time Clock (PRTC) suitable for time; phase and frequency synchronization in packet networks. A PRTC may provide a reference signal for time, phase and frequency synchronization for other clocks within a network or section of a network.

There are many systems that need a precise time synchronization to work properly. For example, base stations for mobile phones and power source monitoring systems depend on such time synchronization. Next Generation Fronthaul Interface (NGFI) time error requirements are shrinking. According to an example, as set forth by Table 1 below, LTE Time Division Duplex (LTE-TDD) time error requirements for an example 3 kilometer (km) cell radius is on the order of +/−5 μs. 5G NR intra & inter-band non-contiguous carrier aggregation with LTE-TDD may require a time error on the order of +/−1.5 microseconds (μs). 5G NR intra & inter-band non-contiguous carrier aggregation may require a time error on the order of +/−130 nanosecond (ns), and location based services using Observed Time Difference Of Arrival (OTDOA) (a positioning feature introduced in Evolved Universal Terrestrial Radio Access (E-UTRA) for LTE (Release 9)) may be on the order of +/−100 ns. E-UTRA intra-band contiguous carrier aggregation may require a time error of +/−65 ns while 5G multiple-input and multiple-output (MIMO) or Transmit (TX) diversity transmissions, at each carrier frequency, may require a time error of +/−32.5 ns.

TABLE 1

NGFI time error requirements

| Category | Time Error (radio) | Application |
| --- | --- | --- |
| A+ | +/−32.5 ns | 5G MIMO or TX diversity transmissions, at each carrier frequency |
| A+ | +/−65 ns | E-UTRA intra-band contiguous carrier aggregation |
| OTDOA | +/−100 ns | Location Based Services using OTDOA |
| B | +/−130 ns | 5G NR intra & inter-band non-contiguous carrier aggregation |
| C | +/−1.5 μs | 5G NR intra & inter-band non-contiguous carrier aggregation with LTE-TDD |
| D | +/−5 μs | LTE-TDD for >3 km cell radius |

Recent changes to ITU standards also underscore the need for shrinking time error requirements. ITU-T G.8273.2/Y.1368.2, Amendment 1, "Timing characteristics of telecom boundary clocks and telecom time slave clocks," (March 2020) provides requirements for Telecom Boundary Clocks (T-BC) and Telecom Time Slave Clocks (T-TSC). In particular, requirements are provided in Tables 7-1 and 7-2 thereof. PTP and 1PPS outputs for time error (TE) are set forth with a maximum absolute time error (max|TE|) provided in four different Classes, A, B, C, and D. Class A and Class B Max|TE| in ns for T-BC and T-TSC are referenced from ITU-T G.8262, "Timing and synchronization aspects in packet networks," (August 2019), Class C and Class D Max|TE| in ns for T-BC and T-TSC (in combination with enhanced synchronous equipment clocks) are referenced from ITU-T G.8262.1 (set forth above). Max|TE| in nanoseconds (ns) for Classes A, B, C, and D are set forth in Table 2 below. Note that only for class D in Table 2, Max|TE| actually refers to Max|$TE_L$| which is maximum absolute time error low pass filtered.

TABLE 2

Max|TE| -- ITU-T G.8273.2/Y.1368.2, Amendment 1

| T-BC/T-TSC Class | Max|TE| (ns) |
| --- | --- |
| A | 100 ns |
| B | 70 ns |
| C | 30 ns |
| D | 5 ns |

To conceptualize 5G time error constraints of, for example, 32.5 ns (set forth in Table 1), the speed of light in a vacuum and an example optical fiber is examined. The speed of light in a vacuum (c) is defined as 299,792,458 m/s. For 1/c, light in a vacuum takes approximately 3.3 ns to travel one meter (m). Hence, for an ideal optical fiber having a length of 10 m (3.3 ns/m×10 m=33 ns), light propagates for 33 ns, which exceeds the 32.5 ns time error constraints of 5G. Propagation of light through an example fiber or propagation of an RF signal through an example coax is slower. By example, Corning Single Mode Fiber 28 (SMF-28) provides a core index of refraction of 1.4682 at a wavelength of 1550 nanometer (nm). Accordingly, light may propagate through an example optical fiber at c/1.4682=204,190,477 m/s. For 1/c, light in the example optical fiber may take approximately 4.9 ns to travel one meter. Hence, for an SMF-28 example fiber having a length of 7 m (4.9 ns/m×7 m=34.3 ns), light propagates for 34.3 ns, which exceeds the 32.5 ns time error constraints of 5G. According to an example, a goal may be characterized as providing time synchronization uncertainties to be less than 1 ns for 1PPS signals. Observed time discrepancies during measurement of 1PPS signals have been found to be greater than 100 picoseconds (ps) even under laboratory conditions. In practice, these discrepancies may accumulate and contribute to a loss of precision in 5G RANs.

FIG. 1 shows a block diagram of an example of a 5G RAN 100. FIG. 1 also shows test device 205, which according to an example of the present disclosure, can be used to determine unknown PD in a GSDS, such as an unknown PD between a GNSS antenna receiving a GNSS signal from a GNSS satellite and a GM. The test device 205 determines the unknown PD, and the GM may be programmed with a timing offset based on the determined PD in order to correct the accuracy of the clock signal output by the GM and distributed to other clocks in the network for synchronization. The clock signal output by the GM provides reference time and phase synchronization signal traceable to a recognized time standard UTC(*) for other clocks within the telecommunication networks. Securing stringent time/phase is a key point for providing better Quality-of-Services (QoS) in LTE LTE-Advanced networks, such as described with respect to the tables above.

FIG. 1 shows examples of two different PDs that can be determined for two different GSDS's 112 and 132 by the test device 205. Two test devices are shown to illustrate that the test device 205 can be used to determine the PDs for different GSDS's. In operation, two of the test devices 205 may be used to simultaneously determine the different PDs or a single test device may be used at different times to determine the PDs. Also, the test device 205 may be used to determine PDs in the 5G RAN 100 or in other types of RANs or telecommunication networks.

As shown in FIG. 1, the 5G RAN 100 may include Mobile Switch Center (MSC) 102 provides control for network switching subsystems according to a clock signal provided by GM 104. MSC 102 includes core network 106, which receives timing control from GM 104. According to an example, core network 106 may be an Evolved Packet Core (EPC) network set forth in LTE Release 8. An overview of LTE Release 8 is provided by 3GPP, "Overview of 3GPP Release 8," v0.3.3 (2014 September), with detailed specifications and supporting documents. An EPC network supports the LTE Evolved Packet System (EPS), which is Internet-Protocol (IP) based. An LTE access network is a network of base stations, known as evolved Node B (eNodeB), and generally has a flat architecture. The LTE Release 8 standard provides a Universal Mobile Telecommunications System (UMTS) Terrestrial Radio Access Network (UTRAN), and is set forth in 3GPP Technical Specification (TS) TS 21.101 v8.4.0, "Technical Specifications and Technical Reports for a UTRAN-based 3GPP system," (2012 March). Additionally, or alternatively, core network 106 may be a 5G System (5GS) core network. Standardization is ongoing in 3GPP and is anticipated to be in multiple stages. Stage 1 for 5G NR was completed by 3GPP, and is set forth as 3GPP TR 21.915 v15.0.0, "Technical Specification Group Services and System Aspects (Release 15)," (2019 September).

In an example, the GM 104 includes GNSS receiver 105, which generates a 1PPS signal from the GNSS satellite signals received from the GNSS satellite 110 via the GSDS 112. The GNSS receiver 105 and GM 104, and similarly GNSS receiver 121 and GM 122, may be integrated in a single device. According to an example, GNSS antenna 108 receives GNSS signals from GNSS satellite 110 and communicates the GNSS signals to GNSS receiver 105 by way of GSDS 112, which may include cables and various passive or active elements, such as splitters, repeaters, and surge arrestors. GNSS receiver 105 generates a 1PPS signal synchronized to UTC using the GNSS signals, and based on the 1PPS signal, the GM 104 outputs a GM clock signal, such as a root timing reference. The GM 104 distributes the GM clock signal to other clocks in the network so the clocks can synchronize to the GM 104. GNSS antenna 108 may be located in an exterior location for detection of the GNSS signals, such as a roof top, while GNSS receiver 105, GM 104 and core network 106 may be located within a building structure, by way of example. GM 104 may communicate with GM 122 using PTP Over Ethernet according to ITU-T standard G.8275.1, "Precision time protocol telecom profile for time synchronization," to provide synchronization. GNSS antenna 108 and GSDS 112 may have an unknown PD, which contributes to a delay in the 1PPS signal output from GNSS receiver 105 when compared to the timing signal transmitted in the GNSS signals from the satellite 110.

According to an example, C-RAN hub 120 includes GM 122, aggregation router 124, and a Fronthaul Transportation Node (FTN) formed by FTN mux 126 and FTN gateway 128. GNSS antenna 130 receives GNSS signals from GNSS satellite 110 and communicates the GNSS signals to GM 122 by way of GSDS 132. In turn, GNSS receiver 121 of GM 122 calculates a 1PPS signal using the received GNSS signals and outputs the 1PPS signal, and the GM 122 can output a GM clock signal for synchronization. As set forth in greater detail below, GSDS 132 may be coax or a combination of coax and fiber. Additionally, or alternatively, GSDS 132 may include in-line active or passive RE elements, i.e., in-line network elements. GNSS antenna 130 may be located in an exterior location for detection of the GNSS signals, such as a roof top, while GNSS receiver 121, GM 122 and the elements of C-RAN hub 120 may be located within a budding structure, by way of example. Aggregation router 124 may communicate information between core network 106 and RU 150 DU/RU 152, and CU/DU RU 154 and may receive timing signals from GM 122. According to an example DU/RU 152 may be a DU, RU, or combination thereof, and CU/DU/RU 154 may be a CU, DU, RU, or combination thereof. FTN mux 126 and FTN gateway 128 may receive timing signals from GM 122 by way of aggregation router 124.

GM 104 and GM 122 may be provided in a master-slave configuration, with one functioning as a master and one functioning as a slave using PTP. The unknown PD of GSDS 132 will offset the 1PPS signal output by GNSS receiver 121 and may hinder synchronization between GM 104 and GM 122. Moreover, the unknown PD of GSDS 112 will be different from the unknown PD of GNSS antenna 130 and GSDS 132, which may hinder synchronization and contribute to reduced precision.

Aggregation router 124 communicates between core network 106, FTN mux 126 and FTN gateway 128 in accordance with timing from GM 122. FTN mux 126, internal to C-RAN hub 120, may communicate with FTN mux 140, external to C-RAN hub 120, by way of GSDS 142. GSDS 142 may be a 100 GbE computer networking technology for transmitting Ethernet frames at rates of 100 gigabits per second (Gbit/s, also known as G) or greater, according to IEEE 802.3cd-2018, "IEEE Standard for Ethernet—Amendment 3," (February 2019) or other versions thereof. FTN mux 1267 and FTN mux 140 may include modules, such as 100G transceiver form factor modules, that provide fiber communication by way of different optical and electrical interfaces. FTN mux 140 may connect to RU 150 to provide 5G cellular communication. FTN gateway 128 may communicate with DU/RU 152 by way of GSDS 144. Likewise, FTN gateway 128 may communicate with CU/DU/RU 154 by way of GSDS 146. According to an example 5G architecture, CUs, DUs, and RUs may be co-located and/or virtually connected.

According to an example, fronthaul network 160 of 5G RAN 100 illustrates a portion of a 5G network where a very low time error may be required. Fronthaul network 160 further illustrates an area with higher RF overlap and radio overlay. Moreover, fronthaul network 160 illustrates an area with a greater risk of timing related interference. As further set forth in greater detail below, the test device 205 may connect to GSDS 132 to determine the PD of GSDS 132. The PD may be programmed into GM 122 as a GM offset. This allows the GM 122 to output a more accurate clock signal that takes into account the PD of GSDS 132, which then can be used by applications discussed above that require a high-precision clock signal.

Figure 2:
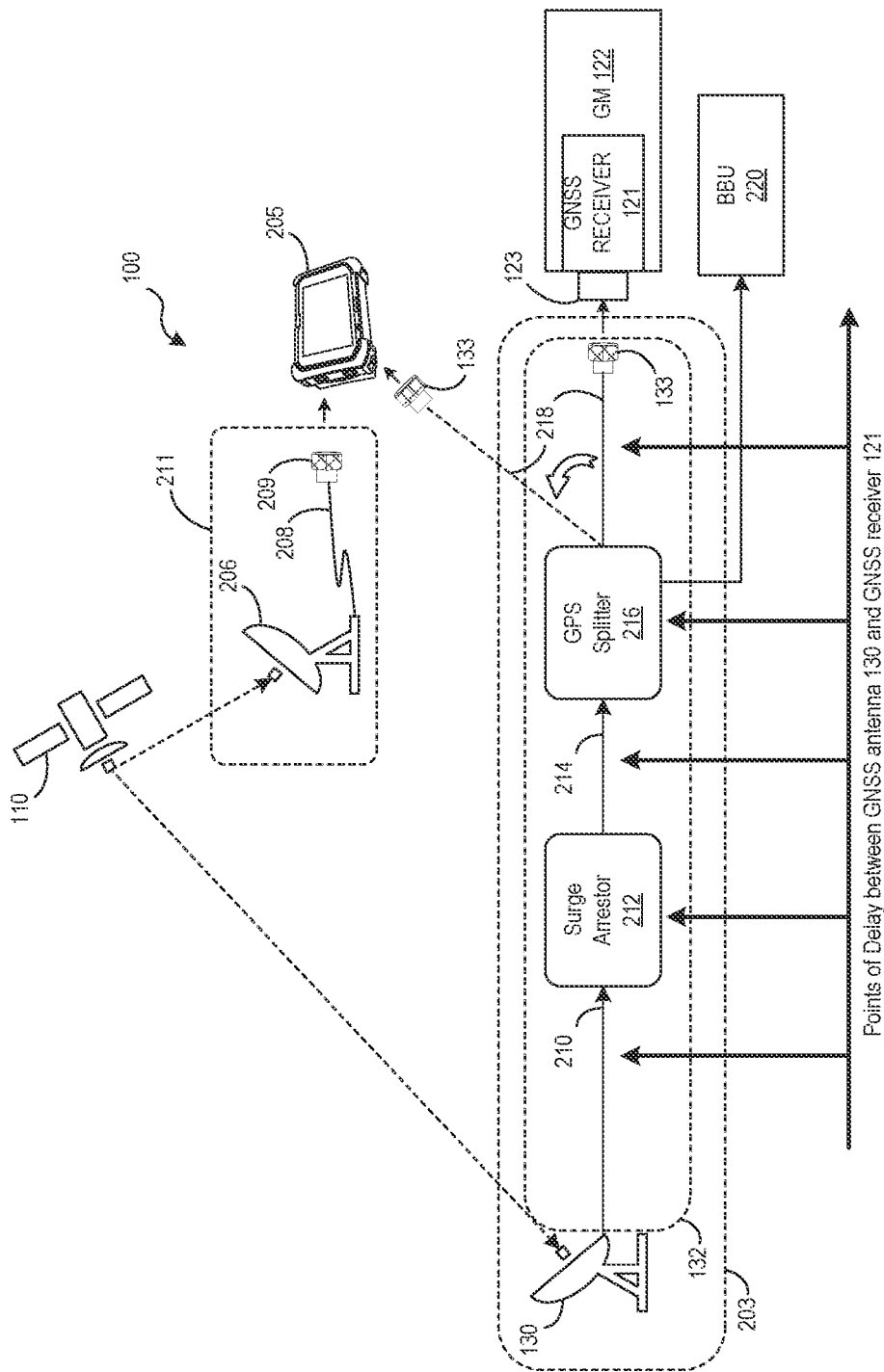
FIG. 2 is a block diagram illustrating testing in a fronthaul network, according to an example of the present disclosure.

FIG. 2 is a block diagram illustrating testing of a device under test (DUT), shown as DUT 203, in a fronthaul network, according to an example. The DUT 203, in this example, includes GNSS antenna 130 and GSDS 132, which are also shown in FIG. 1. Test device 205 includes a GNSS receiver and a tunable clock, as is further discussed below with respect to FIGS. 6-8. The clock may be an atomic clock, such as a rubidium atomic clock having a tunable rubidium oscillator in which a specified hyperfine transition of electrons in rubidium-87 atoms is used to control the output frequency. As is further described below, the GNSS receiver of the test device 205 may be used to generate a 1PPS signal. The clock can be tuned to the 1PPS signal and maintain the 1PPS signal with minimal drift that complies with timing requirements discussed above for 5G applications. When referring to a reference GSDS, it may include the GNSS antenna and the GSDS of the reference GSDS connected between the GNSS antenna and the test device. Similarly, when referring to the DUT, it may include the GNSS antenna of the DUT and the GSDS connected between the GNSS antenna of the DUT and the GM or test device. DUT GNSS signals have an unknown PD and reference GNSS signals have a known PD that can be determined prior to testing the DUT 203. Reference GNSS signals and DUT GNSS signals origins e rom the same source, such as GNSS satellite 110 or a same group of GNSS satellites.

Prior to testing and in normal operation, the DUT GNSS signals are received by GNSS antenna 130 and communicated by GSDS 132 through connectable interface 133 to receiver input 123 of GNSS receiver 121 of GM 122. In normal operation, GM 122 receives the DUT GNSS signals and decodes the received GNSS signals to determine the embedded time information and can calculate and output a corresponding 1PPS signal. For example, GNSS receiver 121 generates the 1PPS signal based on the received GNSS signals, and GM 122 outputs the 1PPS signal. The 1PPS signal is synchronized to Coordinated Universal Time (UTC). The 1PPS signal may be used to synchronize clocks across fronthaul network 160 as discussed above.

In order to test the DUT 203 to determine the PD of DUT 203, test device 205 is connected to the DUT 203, for example, via connectable interface 133, to receive DUT GNSS signals from GNSS antenna 130. Also, the test device 205 is connected to reference GSDS 211, for example at a later time or earlier time than connecting to the DUT 203, via the connectable interface 209 to receive reference GNSS signals from reference GNSS antenna 206. Also, an adequate duration location survey is performed by a GPS receiver in the test device 205 to work out its location when connecting to the DUT 203 and when connecting to the reference GSDS 211. If the locations of the GNSS antennas are accurately known, then the survey can be skipped and the locations can be entered manually. The surveys are done to ensure generation of accurate 1PPS signals. As is further described below, 1PPS signals generated from the received reference GNSS signals and DUT GNSS signals are compared to determine the PD of DUT 203.

According to an example, GSDS 132 of DUT 203 includes coax 210, surge arrestor 212, coax 214, GPS splitter 216 and coax 218, which are connected to connectable interface 133. It will be apparent to one of ordinary skill in the art that GSDS 132 may include other types of cable and devices, such as other in-line elements, for communicating received GNSS signals to GM 122. Surge arrestor 212 and GPS splitter 216 are in-line RF elements. GPS splitter 216 may be an active GPS splitter or a passive GPS splitter. Additionally, or alternatively, GSDS 132 may include a number of additional in-line RF elements, such as an active amplifier, an active GPS regenerator, a passive surge arrestor, or a passive GPS splitter. GPS splitter 216 may provide the DUT GNSS signals to a number of RAN elements, such as BBU 220 or a BBU pool. Coax 210 is an RF cable communicatively coupled to GNSS antenna 130, coax 214 is an RF cable communicatively coupled to coax 210, and coax 218 is an RF cable communicatively coupled to coax 214 and communicatively coupled via connectable interface 133 to receiver input 123 of GNSS receiver 121.

GNSS signal PD in an RF cable may be significant for 5G applications. For an RF cable length X, signal PD may be represented in ns per foot (ft) of cable. For example, a Radio Guide 59A (RG-59A) RF cable may have a signal PD of about 1.54 ns/ft. Thus, for a 50 ft cable, the signal PD would be (50 ft×1.54 ns/ft=77 ns) 77 ns. An RG-59A cable has a characteristic impedance of about 73 ohms (Ω), and a capacitance of about 21 picofarad (pF)/ft. Connectable interface 133 of GSDS 132 may be a SubMiniature version A (SMA) coaxial RF connector with a screw-type coupling mechanism, having a 50Ω impedance. Accordingly, connectable interface 133 itself, along with other in-line interfaces, may contribute to PD.

Additional in-line elements may be communicatively coupled within GSDS 132 and may include in-line GPS amplifiers, also known as Low Noise Amplifiers (LNAs), and GPS Down/Up converters, both of which may increase PD of DUT 203. An in-line GPS amplifier decreases GNSS signal attenuation by amplifying a received signal, thereby permitting additional cable length. In-line GPS amplifiers may attach directly in line with an antenna cable and use the same power as the antenna. A GPS Down/Up converter may permit GSDS 132 runs of 250 to 1500 feet (75 m to 457 m). Signal down conversion may require a GPS antenna down-converter and corresponding signal up-converter. A GPS antenna down-converter converts the GPS signal down to a lower frequency that is less susceptible to attenuation, and transmits the signal to the up-converter. The up-converter then restores the signal to the normal GPS signal frequency for the receiver. The down/up conversion process as well as any PD in DUT 203 is generally transparent to GNSS receiver 121 or any other connected GNSS receiver.

Figure 3:
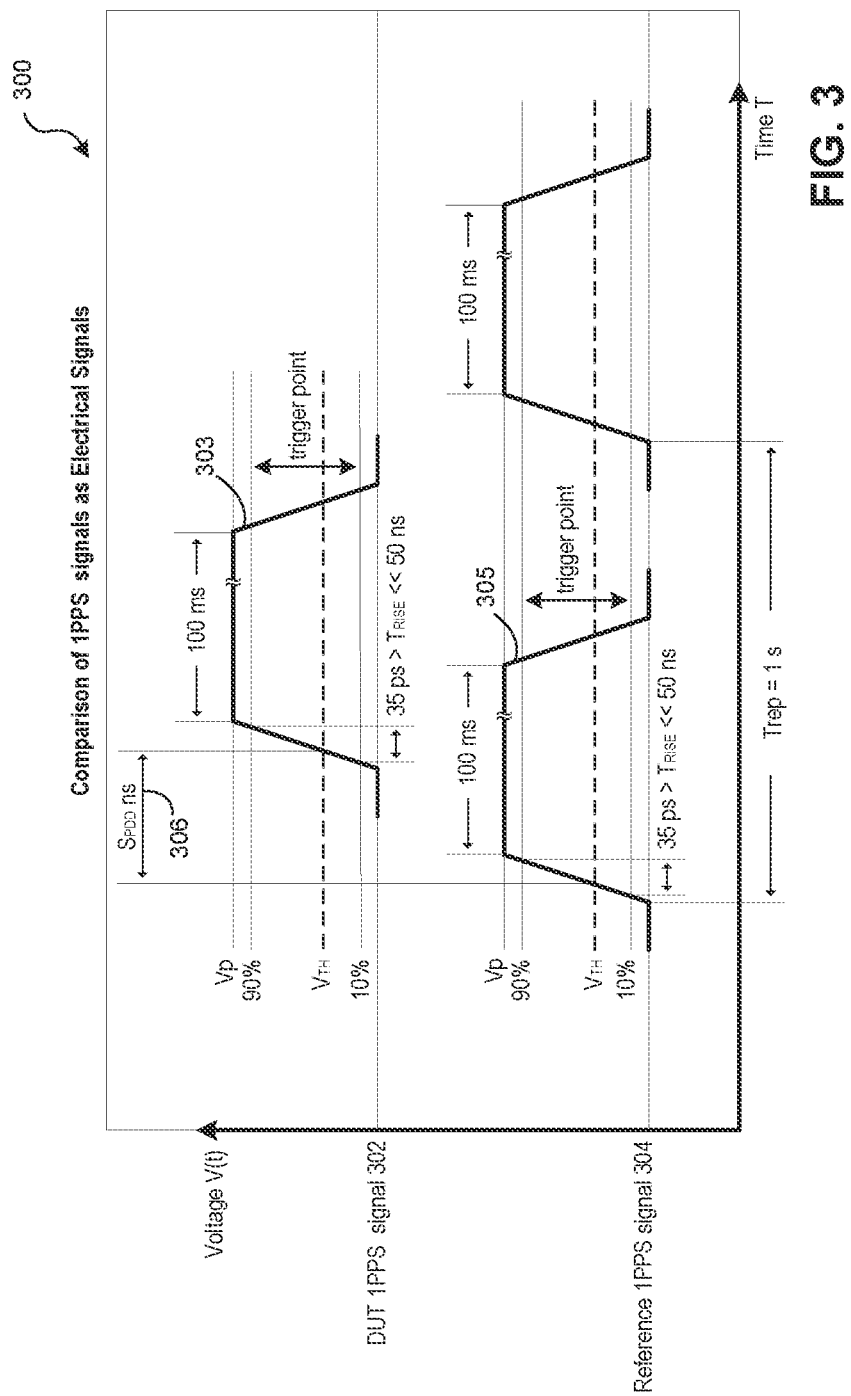
FIG. 3 is a timing diagram of pulse edge detection, according to an example of the present disclosure.

FIG. 3 illustrates a timing diagram 300 of pulse edge detection for comparing 1PPS signals, according to an example of the present disclosure. As set forth above, a GNSS receiver can receive a GNSS signal, calculate a 1PPS signal from the received GNSS signal, and output a high-precision 1PPS signal. Test device 205 includes a GNSS receiver that can generate a 1PPS signal from received GNSS signals. When the test device 205 is connected to the DUT 203, the GNSS receiver generates a 1PPS signal, referred to as DUT 1PPS signal 302 from the DUT GNSS signals received from DUT 203. Also, the test device 205 can generate a reference 1PPS signal 304 based on the received GNSS signals from reference GSDS 211. An off-the-shelf GPS receiver (also referred to as a GPS module) that generate a 1PPS signal from GNSS signals may be used in test device 205 to generate and output a 1PPS signal from GNSS signals.

As illustrated in FIG. 3, DUT 1PPS signal 302 is represented as an electrical signal by DUT signal pulse 303, and reference 1PPS signal 304 is represented as an electrical signal by reference signal pulse 305. Timing diagram 300 has a vertical axis representing received pulse voltage (V) as a function of time V(t) and a horizontal axis representing time T. DUT 1PPS signal 302 and reference 1PPS signal 304 are periodic rectangular waves typically with a leading edge beginning at each second and having a duration of 100 milliseconds (ms). As illustrated, the leading edge of DUT signal pulse 303 and reference signal pulse 305 have been exaggerated to illustrate edge transition as a step wave.

According to an example, a detected peak voltage Vp may be 2.5 V @50Ω, a threshold voltage ($V_{TH}$) for triggering leading edge detection may be 1 V, and a signal period of repetition Trep may be 1 second (s). A timing event, also referred to as a time of detection, for example, is where each electrical signal pulse crosses $V_{TH}$. Signal propagation delay difference (PDD) 306, $S_{PDD}$, is illustrated as a difference between DUT signal pulse 303 $V_{TH}$ and reference signal pulse 305 $V_{TH}$. According to an example, signal PDD 306, while generally measured in ns may be detected with an associated precision of single digit ns, tenths of single digit ns, hundreds of ps, or as low as tens of ps. A time of voltage rise of a detected voltage pulse ($T_{RISE}$) may be greater than 35 ps and much less than 50 ns. A leading edge detection circuit may trigger and provide pulse detection at $V_{TH}$, between 10% and 90% of Vp.

Figure 4:
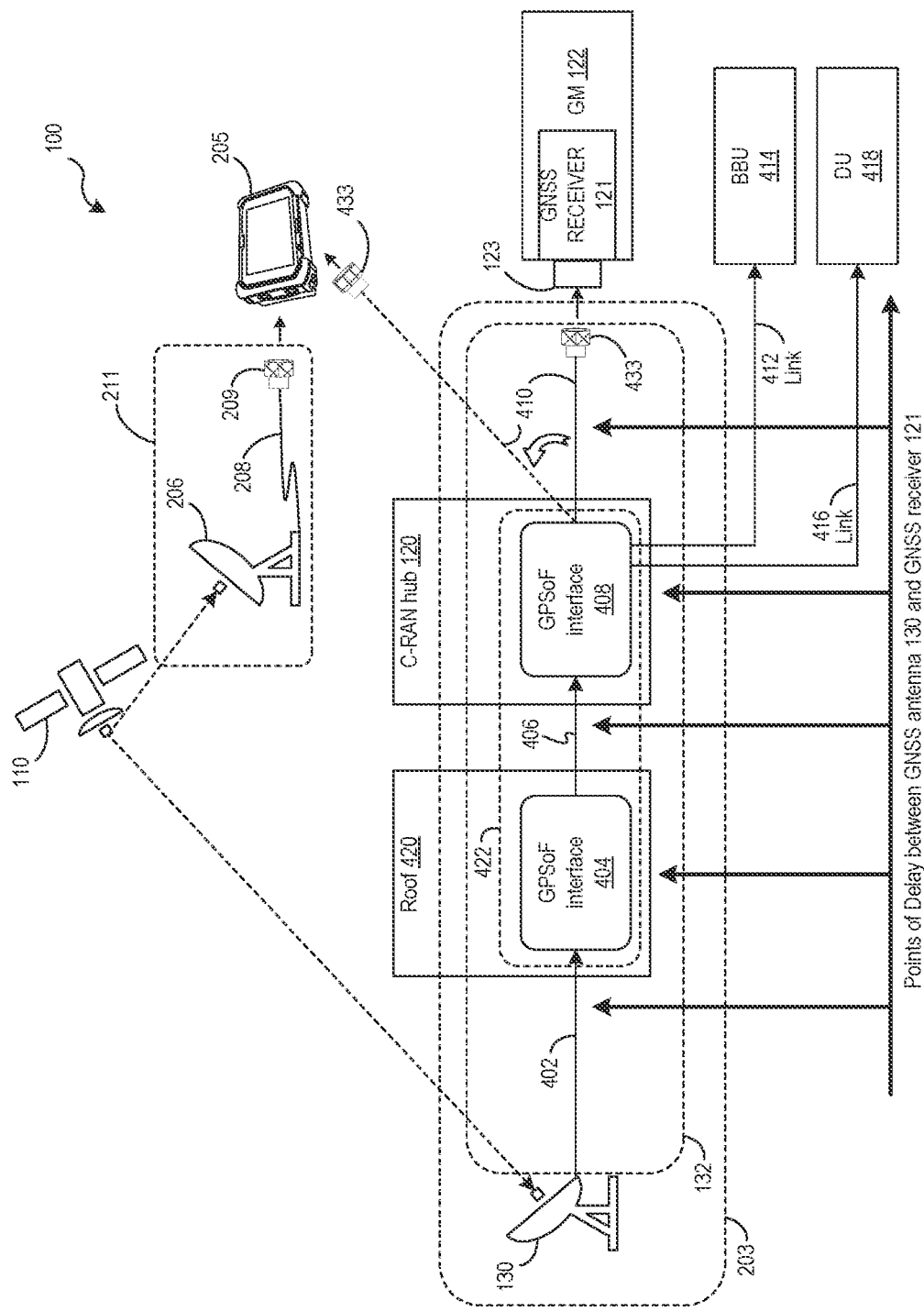
FIG. 4 is a block diagram illustrating testing in a fronthaul network, according to an example of the present disclosure.

As was discussed above, FIG. 2 is a block diagram illustrating testing of DUT 203. FIG. 4 illustrates another example of testing the DUT 203, whereby the DUT 203 includes a GSDS comprising different elements than shown in FIG. 2. As shown in FIG. 4, GSDS 132, by way of example, includes coax 402, GPSoF interface 404, fiber 406, GPSoF interface 408, and coax 410 connected to connectable interface 433. The combination of GPSoF interface 404, fiber 406, and GPSoF interface 408, may be referred to as GPSoF link 422. DUT GNSS signals are output from DUT 203 and have an unknown PD. Reference GNSS signals are output from reference GSDS 211 and have a known PD. GPSoF link 422, included in DUT 203, contributes to PD.

Prior to testing and in normal operation, the DUT GNSS signals are received by GNSS antenna 130 and communicated by GSDS 132 through connectable interface 433 to receiver input 123 of GNSS receiver 121 of GM 122. GNSS receiver 121 generates a 1PPS signal based on the received GNSS signals, and GM 122 outputs the 1PPS signal. In order to test the DUT 203 to determine the PD of DUT 203, test device 205 is connected to the DUT 203, for example, via connectable interface 433, to receive DUT GNSS signals from GNSS antenna 130. Also, at a later time or earlier time than connecting to the DUT 203, the test device 205 is connected to reference GSDS 211, for example, via connectable interface 209 to receive reference GNSS signals from reference GNSS antenna 206. As is further described below, the received reference GNSS signals and DUT GNSS signals are compared to determine the PD of DUT 203.

Fiber 406 may be a single-mode fiber (SMF) to carry a single mode of light in a transverse mode. Fiber 406 may have a core diameter between 8 and 10.5 μm and a cladding diameter of 125 μm, and be able to communicate data at 40 Gbit/s, 100 Gbit/s, or above.

GPSoF interface 404 may be located on roof 420 of a structure. Additionally, or alternatively, GNSS antenna 130 may also be located on roof 420. GPSoF interface 408 may be located in C-RAN hub 120. GPSoF interface 408 may communicate with BBU 414 over link 412 and may communicate with DU 418 over link 416. Links 412 and 416 may be coax or fiber. Transport of GNSS signals from GNSS antenna 130 to multiple locations is also known as GPS to multipoint. BBU 414 may be a plurality of BBUs in a BBU hub. DU 418 may be an RU, CU, or DU; a plurality of RUs, CUs, or DUs; or any combination thereof.

GPSoF link 422 permits GNSS signals to be transmitted with minimal losses over long cable distances, while being resistant to noise. GPSoF link 422 is generally transparent to GNSS antenna 130 and GNSS receiver 121, or any other receiver unit. GPSoF link 422 may be a source of associated PD. As part of an installation, an antenna dependent voltage may be applied to GNSS antenna 130 before GPSoF link 422. Likewise, downstream hardware may provide open-circuit and over-current antenna detection, which may be addressed in a GPSoF link 422. Downstream hardware may include GNSS receiver 121, GM 122, or a PTP server. To avoid triggering antenna open-circuit detection in downstream hardware, GPSoF link 422 may include a resistive circuit or resistor fitted across an output connector to emulate an antenna connection. For example, a 200Ω resistor may be fitted across an output of GPSoF link 422 to draw a few milliamperes (mA) from downstream hardware. The downstream hardware then detects correct antenna connection. The resistive circuit may contribute to PD.

GPSoF link 422 may include low-noise amplifiers (LNAs), analog or digital attenuators, optical power meters, pre and post amplifiers, gain controllers, and optically managed switches (also known as optical switches). An optical switch is a component with two or more ports that selectively transmit, redirect, or block an optical signal in a transmission medium. An optical switch may be mechanical (such as micro-electro-mechanical systems (MEMS)), electro-optic, magneto-optic, piezoelectric, or other type. Optical signals transmitted through GPSoF link 422 are not affected by RF interference, thereby permitting transport of GNSS signals through noisy RF environments. The components within GPSoF link 422, or other components within DUT 203, are generally transparent to GNSS receiver 121.

Figure 5:
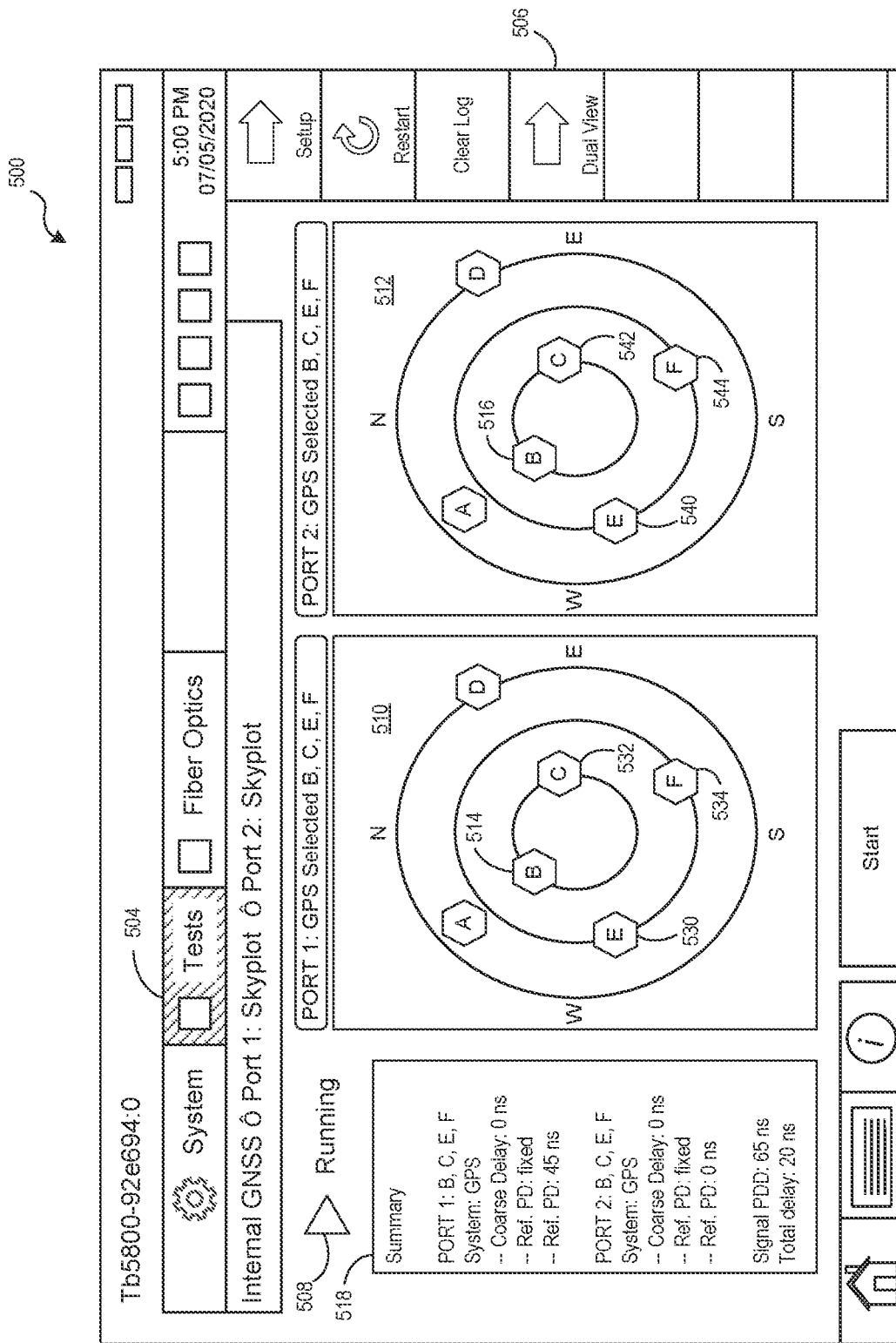
FIG. 5 illustrates an interface for a test device, according to an example of the present disclosure.

FIG. 5 illustrates a user interface 500 for test device 205, according to an example of the present disclosure. Interface 500 may be a graphical user interface (GUI) to control operation of test device 205. In an example, the user interface 500 may be used to identify and select a particular GNSS constellation of satellites or a particular satellite or a set of satellites in a GNSS constellation of satellites. In another example, the GNSS receiver of the test device 205 has the ability to be put into "Timing" mode where only 1 satellite is predetermined and needed for outputting the 1PPS. In the example, where the interface 500 is used to select a particular satellite, the interface 500 may be operated by a technician to select a satellite test by operating test button 504, and to select a dual satellite view by operating dual view button 506. Detection button 508 may be operated to display a group of satellites transmitting GNSS signals in skyplot 510, corresponding to Port 1, and display a group of satellites transmitting GNSS signals in skyplot 512, corresponding to Port 2. Satellites displayed in skyplot 510 and skyplot 512 may have associated individual reference identifiers (IDs), which are illustrated with letters for explanation. The same satellite or same group of satellites is selected in skyplot 510 and skyplot 512 for reception of the same GNSS signals. According to an example, in skyplot 510, GNSS satellite 514, designated by letter "B" is selected. In skyplot 512, GNSS satellite 516, also designated by the letter "B" is selected. By operating interface 500, the same satellite "B" is selected to be GNSS satellite 110 illustrated in FIGS. 1, 2 and 4. Summary table 518 may display information about GNSS satellite 514 and GNSS satellite 516 alternatively or cumulatively. According to another example, in skyplot 510, a group of satellites are selected: GNSS satellite 514 (designated by letter "B"); GNSS satellite 530 (designated by letter "E"); GNSS satellite 532 (designated by letter "C"); and GNSS satellite 534 (designated by letter "F"). Likewise, in skyplot 512, the same group of satellites are selected: GNSS satellite 516 (designated by letter "B"); GNSS satellite 540 (designated by letter "E"); GNSS satellite 542 (designated by letter "C"); and GNSS satellite 544 (designated by letter "F"). By operating interface 500, the same satellites "B," "E," "C," and "F" are selected to be GNSS satellite 110 illustrated in FIGS. 1, 2 and 4.

Figure 6:
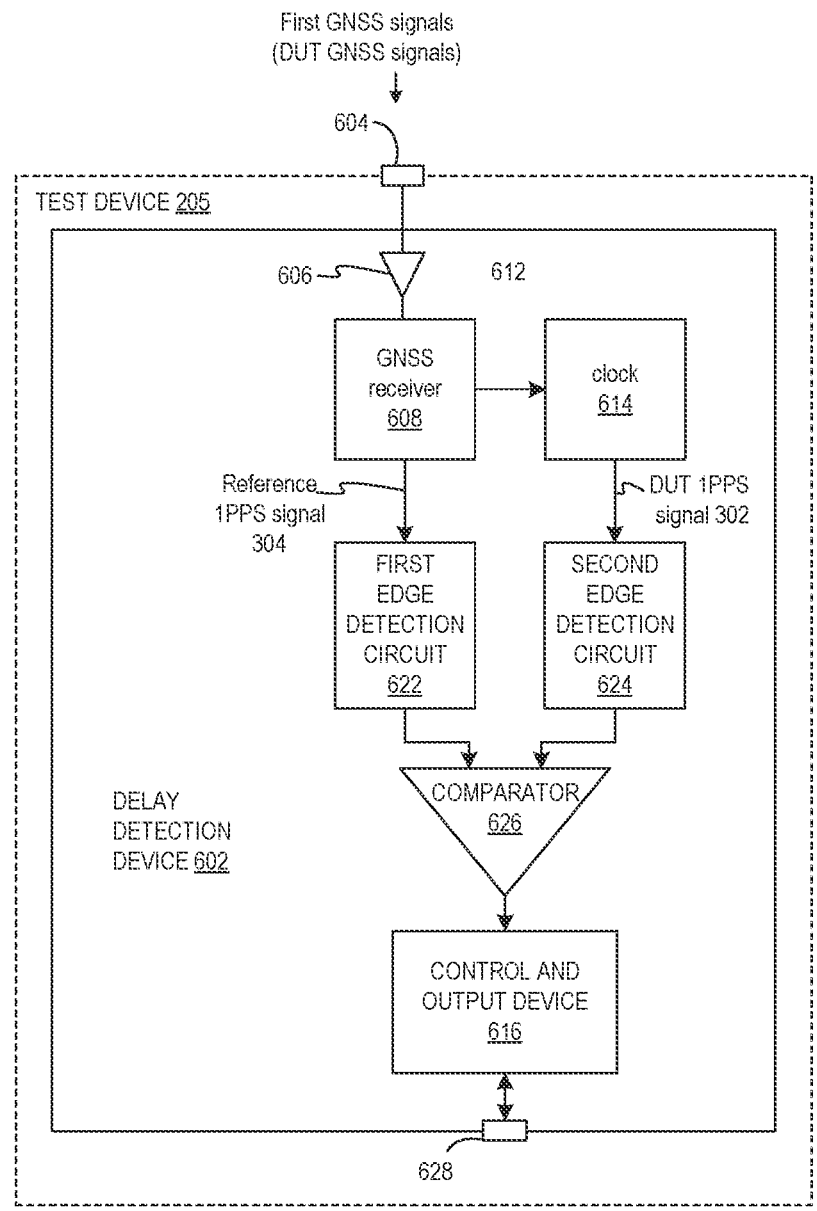
FIG. 6 is a block diagram of a test device including an edge detection device, according to an example of the present disclosure.

FIG. 6 is a block diagram showing some of the components of test device 205 including a delay detection device 602, according to an example of the present disclosure. Delay detection device 602 may be a component or modular component of test device 205, illustrated in FIGS. 1, 2 and 4. It will be apparent to one of ordinary skill in the art that the test device 205 shown in FIGS. 6 and 7 may include components other than shown.

Test device 205 includes ports that may be connectable to interfaces 209, 133 and 433 shown in FIGS. 2 and 4. In an example, port 604 is connectable to DUT 203 and to reference GSDS 211 at different times to determine the unknown PD of DUT 203. The ports of test device 205 may include optical interfaces, such as SFPs connectable to fibers of DUT 203 or reference GSDS 211.

Test device 205 includes GNSS receiver 608 and clock 614. According to an example, GNSS receiver 608 may be a processor, a field programmable gate array (FPGA), or embedded GNSS receiver including a processor, digital block control including a GNSS engine, an RF block and fractional synthesizer to receive and decode the GNSS signals, a real time clock, and pinouts including input/output interface to output a 1PPS signal. GNSS signals are received into delay detection device 602, amplified by low noise amplifier (LNA) 606, and input into GNSS receiver 608. GNSS receiver 608 calculates and outputs a 1PPS signal corresponding to the received GNSS signals. The GNSS receiver 608 is capable of operating in a survey mode to accurately determine its position, e.g., longitude, latitude, and altitude, from satellites. After completing a survey and determining its position, the GNSS receiver 608 can operate in a timing mode to generate a 1PPS signal from GNSS signals received for example via 604, such as when the testing device 205 is connected to DUT 203 or reference GSDS 211.

Clock 614 is capable of maintaining a 1PPS signal output by the GNSS receiver 608. Clock 614 may be an atomic clock, such as a rubidium atomic clock having a rubidium oscillator in which a specified hyperfine transition of electrons in rubidium-87 atoms is used to control the output frequency. In another example, clock 614 may include an Oven Controlled Crystal Oscillator (OCXO). Clock 614 can be tuned to the 1PPS signal output by the GNSS receiver 608 and maintain the 1PPS signal with minimal drift that complies with timing requirements discussed above for 5G applications.

In an example, the GNSS receiver after connecting to a GSDS, such as one of DUT 203 or reference GSDS 211 the GNSS receiver 618 outputs a 1PPS signal based on GNSS signals received via the GSDS. The GNSS receiver 618 is then placed in holdover mode, and sends the 1PPS signal to the clock 614. Clock 614 is tuned to the 1PPS signal and outputs the 1PPS signal. In holdover mode, clock 614 can operate without receiving its controlling input and is using stored data, acquired while in locked operation, to control its output. The stored data are used to control phase and frequency variations, allowing the locked condition to be reproduced within specifications. For example, holdover begins when the clock output no longer reflects the influence of a connected external reference, or transition from it. Holdover can terminate when the output of the clock reverts to locked mode condition. According to an example, the test device 205 is connected to DUT 203, and a 1PPS signal is generated. The clock 614 is placed in holdover mode so the 1PPS signal is maintained and output by the clock 614, shown as DUT 1PPS signal 302 output from 614. The test device 205 is disconnected from DUT 203 and connected to reference GSDS 211, and a 1PPS signal is generated based on GNSS signals received via GSDS 211 and output from the GNSS receiver 608, shown as reference 1PPS signal 304 output from GNSS receiver 608. Then, DUT 1PPS signal 302 and reference 1PPS signal 304 can be compared, such as shown in FIG. 3, to determine signal propagation delay difference (PDD) 306, $S_{PDD}$. Thus, a single GNSS receiver, e.g., the GNSS receiver 608, can be used to determine the signal delay of DUT 203, instead of requiring two GNSS receivers to generate and compare the DUT 1PPS signal 302 and reference 1PPS signal 304. In an example, GSDS reference 211, including reference GNSS antenna 206, GSDS 208 and interface 209, is portable and may be carried by a technician. For example, GNSS antenna 206 is portable and is connected to a fiber and can be moved as needed. Thus, the test device 205 may be connected to DUT 203, for example, at a junction box which may be located in a building or other location, to receive GNSS signals via GNSS antenna 130 and generate DUT 1PPS signal 302. Then, subsequently the test device 205 is disconnected from DUT 203 and carried to the top of a building or another location and connected to portable GSDS reference 211 to receive GNSS signals via GNSS antenna 206 and generate reference 1PPS signal 304.

In an example, delay detection device 602 includes first edge detection circuit 622 and second edge detection circuit 624 to compare DUT 1PPS signal 302 and reference 1PPS signal 304 to determine PDD 306, $S_{PDD}$. First edge detection circuit 622 receives the first 1PPS signal output from first GNSS receiver 608, e.g., reference 1PPS signal 304, and second edge detection circuit 624 receives the second 1PPS signal output from clock 614, e.g., DUT 1PPS signal 302.

The output of first edge detection circuit 622 and the output of second edge detection circuit 624 are compared by comparator 626. Comparator 626 determines a time difference illustrated as signal PDD 306, $S_{PDD}$, in FIG. 3. In other words, comparator 626 determines the time difference between the leading edge of DUT signal pulse 303 and the leading edge of reference signal pulse 305. Time difference $S_{PDD}$ may be measured in ns. The time difference $S_{PDD}$ may be stored in control and output device 616, and communicated to other components of test device 205, such as processor 820, memory 830 and storage component 840 of FIG. 8, through communication port 628 and displayed on a display of test device 205.

According to an example, GNSS total delay $GNSS_{TD}$ of DUT 203 may be obtained by comparing the DUT 1PPS signal 302, calculated and generated by first GNSS receiver 608 from the DUT GNSS signals, with the reference 1PPS signal 304, generated by clock 614 based on the reference GNSS signals. The GNSS total delay $GNSS_{TD}$ of DUT 203 may be based on field measurements performed by test device 205. The reference 1PPS signal 304 may have a shorter PD than the DUT 1PPS signal 302 due to a shorter length of GSDS 208 of reference GSDS 211. According to an example, signal PDD, $S_{PDD}$, may be obtained by subtracting a time of detection of reference 1PPS signal 304 $T_{1PPS\ 304}$ from a time of detection of DUT 1PPS signal 302 $T_{1PPS\ 302}$, and, as follows:

$$S_{PDD}=T_{1PPS\ 302}-T_{1PPS\ 304} \quad \text{EQUATION 1}$$

Reference GSDS 211 has associated information identifying signal propagation delay. In other words, reference GSDS 211 includes reference GNSS antenna 206, which has a known antenna offset delay $GNSS206_{PD}$, and GSDS 208, which has a known PD $GSDS208_{PD}$. For example, a total reference PD of reference GSDS 211 may be predetermined and stored in the test device 205. For example, prior to testing, total reference PD of reference GSDS 211 may be calculated from stated specifications or measured. The antenna offset delay $GNSS206_{PD}$ of reference GNSS antenna 206 may be determined from known manufacturer specifications or from prior testing. For cables, PD $GSDS208_{PD}$ may be determined as set forth above through multiplication of known signal PD expressed in ns/ft by cable length of GSDS 208. Alternatively, PD $GSDS208_{PD}$ may be previously determined through TDR testing. Accordingly, a total reference PD of reference GSDS 211, $TREF_{PD}$, includes antenna offset delay $GNSS206_{PD}$ of reference GNSS antenna 206 and PD $GSDS208_{PD}$, and may be obtained through addition as follows:

$$TREF_{PD}=GNSS206_{PD}+GSDS208_{PD} \quad \text{EQUATION 2}$$

Total reference PD of reference GSDS 211 $TREF_{PD}$ may be input and stored into test device 205 for later calculations.

The GNSS total delay $GNSS_{TD}$ of DUT 203, including GNSS antenna 130 and GSDS 132, may then be obtained. The signal PDD, $S_{PDD}$, is added to the total reference PD of reference GSDS 211 $TREF_{PD}$ to determine GNSS total delay $GNSS_{TD}$ of DUT 203 as follows:

$$GNSS_{TD}=TREF_{PD}+S_{PDD} \quad \text{EQUATION 3}$$

If signal PDD, $S_{PDD}$, calculated in EQUATION 1 is a positive number, this indicates that the PD of DUT 203 is longer than the PD of reference GSDS 211. GNSS total delay $GNSS_{TD}$ of DUT 203 is then the addition of reference PD of reference GSDS 211, $TREF_{PD}$ and signal PDD $S_{PDD}$. If signal PDD, $S_{PDD}$, calculated in EQUATION 1 is a negative number, this indicates that the PD of DUT 203 is shorter than the PD of reference GSDS 211. GNSS total delay $GNSS_{TD}$ of DUT 203 is then simply the addition of reference PD of reference GSDS 211, $TREF_{PD}$ and negative number signal PDD, $S_{PDD}$. GNSS total delay $GNSS_{TD}$ of DUT 203 is a delay of the entire signal path during installed operation, including delay of GNSS antenna 130, GSDS 132, and any other in-line elements, as set forth above. Hence, GNSS total delay $GNSS_{TD}$ of DUT 203 is present before reception of DUT GNSS signals by GNSS receiver 121. Because GNSS receiver 121 calculates and outputs a time synchronized 1PPS signal at a point in time as observed by GNSS antenna 130, the output 1PPS signal is delayed by GNSS total delay GNSS of DUT 203. According to an example, GNSS total delay $GNSS_{TD}$ may be programmed into GM 122 as a delay offset to provide increased time precision in fronthaul network 160. To program the offset in the GM 122, in an example, the test device 205 may transmit the delay offset to the GM 122 so the GM 122 can save the offset for offsetting the 1PPS signal output from the GM 122. In another example, the offset may be displayed on the test device 205, and manually entered in the GM 122.

According to an example, GNSS antenna 130 has a known antenna offset delay $GNSS130_{PD}$. Make, model, and specifications of GNSS antenna 130 may be known parameters, but the length, format, and presence of in-line elements of GSDS 132 may be unknown. Moreover, GSDS 132 may also include GPSoF link 422, and associated in-line optical elements, such as set forth above and illustrated in FIG. 4. In this case, it may be beneficial to determine the PD of GSDS 132. The PD of GSDS 132, $GSDS132_{PD}$, may be determined by subtracting antenna offset delay $GNSS130_{PD}$ from GNSS total delay $GNSS_{TD}$ as follows:

$$GSDS132_{TD}=GNSS_{TD}-GNSS130_{PD} \quad \text{EQUATION 4}$$

Accordingly, a PD of GSDS 132, $GSDS132_{PD}$, may be stored and used, for example, during future replacement of GNSS antenna 130.

According to another example, GNSS antenna 130 may have a known PD, $GNSS130_{PD}$, obtained from performance specification datasheets. As per above, GNSS antenna 206 has a known PD, $GNSS206_{PD}$. An antenna difference delay, $A_{DD}$, may be obtained by subtracting the PD of reference GNSS antenna 206, $GNSS206_{PD}$, from the PD of GNSS antenna 130, $GNSS130_{PD}$, as follows:

$$A_{DD}=GNSS130_{PD}-GNSS206_{PD} \quad \text{EQUATION 5}$$

A PD of GSDS 132, $GSDS132_{PD}$, may be obtained by subtracting antenna difference delay, $A_{DD}$, from signal PDD, $S_{PDD}$, and adding PD $GSDS208_{PD}$ of reference GSDS 208 as follows:

$$GSDS132_{PD}=S_{PDD}-A_{DD}+GSDS208_{PD} \quad \text{EQUATION 6}$$

In view of the above, actual measured PD of GSDS 132, $GSDS132_{PD}$ from EQUATION 4 may be compared to computed PD of GSDS 132, $GSDS132_{PD}$ from EQUATION 6 to determine if the expected antenna offset delay of GNSS antenna 130 matches measured conditions.

Figure 7:
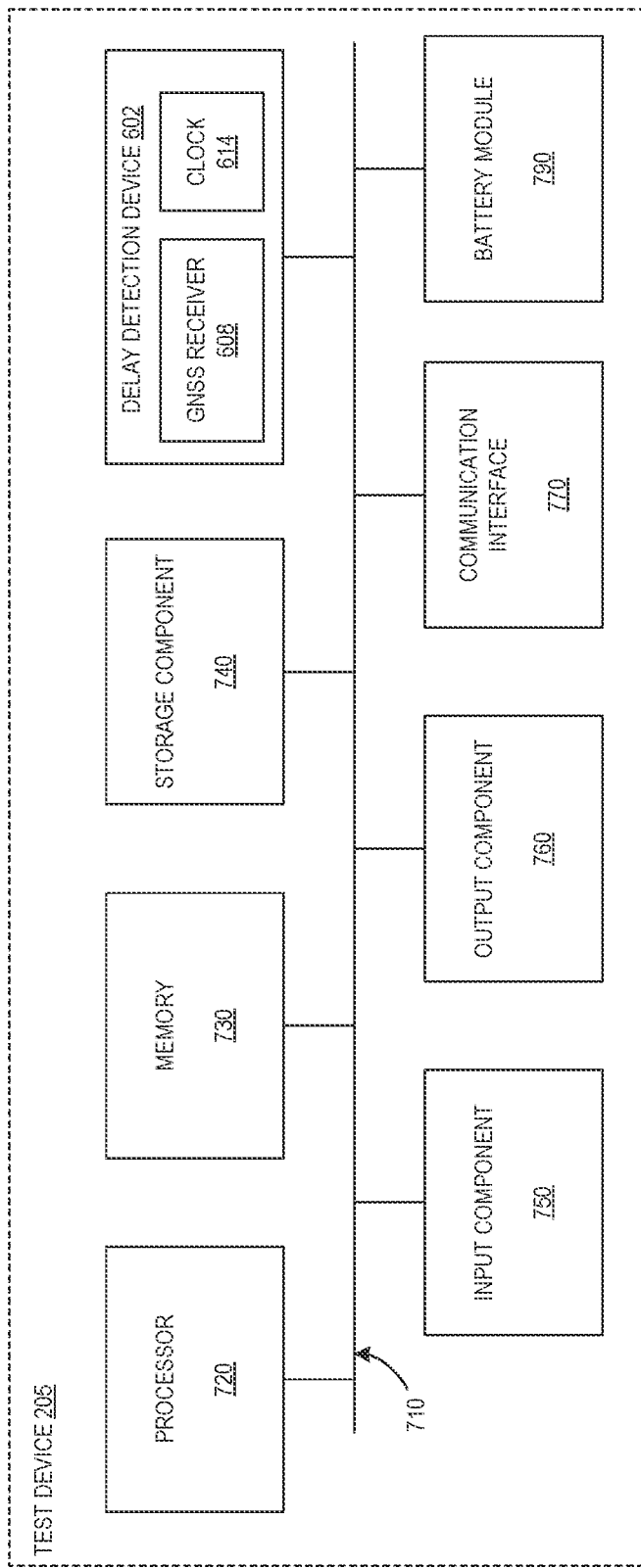
FIG. 7 is a diagram of components of a test device, according to an example of the present disclosure.

FIG. 7 is a diagram of components of test device 205, according to an example of the present disclosure. Test device 205 may include a bus 710, a processor 720, a memory 730, a storage component 740, an input component 750, an output component 760, a communication interface 770, delay detection device 602, and battery module 790. According to an example, delay detection device 602 is delay detection device 602 of FIG. 6. For example, delay detection device 602 includes GNSS receiver 608 and clock 614, which may be comprised of the GNSS receiver 608 and clock 614 shown in FIG. 6. Although not shown, delay detection device 602 may include any of the components of the delay detection device 602 shown in FIG. 6. Also, one or more components of delay detection device 602 may be a processor. For example, one or more of first edge detection circuit 622, second edge detection circuit 624, comparator 626 and control and output device 616 shown in FIG. 6 may be comprised of a microcontroller, a digital signal processor (DSP), a field-programmable gate array (FPGA), an application-specific integrated circuit (ASIC) or other type of processor. GNSS receiver 608 and clock 614 may include separate hardware, such as provided on a chipset that can output signals to other components of delay detection device 602 such as shown in FIG. 6.

Bus 710 includes a component that permits communication among the components of Test device 205. Processor 720 is implemented in hardware, firmware, or a combination of hardware and software. Processor 720 is a central processing unit (CPU), a graphics processing unit (GPU), an accelerated processing unit (APU), a microprocessor, a microcontroller, a DSP, FPGA, ASIC, or another type of processing component. In some examples, processor 720 includes one or more processors capable of being programmed to perform a function. Memory 730 may include one or more memories such as a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of test device 205. For example, storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 750 includes a component that permits test device 205 to receive information, such as via user input (e.g., a touch screen display, a keyboard, a keypad, a mouse, a button, a switch, and/or a microphone). Additionally, or alternatively, input component 750 may include a sensor for sensing information (e.g., a GPS component, an accelerometer, a gyroscope, and/or an actuator). Output component 760 includes a component that provides output information from test device 205 (e.g., a display, a speaker, a user interface, and/or one or more light-emitting diodes (LEDs)). Output component 760 may include a display providing a GUI, such as interface 500. Input component 750 and output component 760 may be combined into a single component, such as a touch responsive display, also known as a touchscreen.

Communication interface 770 includes a transceiver-like component (e.g., a transceiver and/or a separate receiver and transmitter) that enables test device 205 to communicate with other devices, such as via a wired connection, a wireless connection, or a combination of wired and wireless connections. Communication interface 770 may permit test device 205 to receive information from another device and/or provide information to another device. For example, communication interface 770 may include an Ethernet interface, an optical interface, a coaxial interface, an infrared interface, an RE interface, a universal serial bus (USB) interface, a Wi-Fi interface, a cellular network interface, or the like. The test device 205 also includes ports (e.g., shown in FIG. 6) for connecting to the fronthaul to test DUTs, such as for connecting to DUT 203, including GNSS antenna 130 and GSDS 132, and for connecting to reference GSDS 211, including GNSS antenna 206 and GSDS 207. The ports may include optical interfaces, such as SFPs connectable to fibers of DUT 203 and reference GSDS 211.

Battery module 790 is connected along bus 710 to supply power to processor 720, memory 730, and internal components of test device 205. Battery module 790 may supply power during field measurements by test device 205. Battery module 790 permits test device 205 to be a portable integrated device for conducting field measurements of propagation delay in a RAN.

Test device 205 may perform one or more processes described herein. Test device 205 may perform these processes by processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may instruct processor 720 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, test device 205 may include additional components, fewer components, different components, or differently arranged components than those shown in FIG. 7. Additionally, or alternatively, a set of components (e.g., one or more components) of test device 205 may perform one or more functions described as being performed by another set of components of test device 205.

Figure 8:
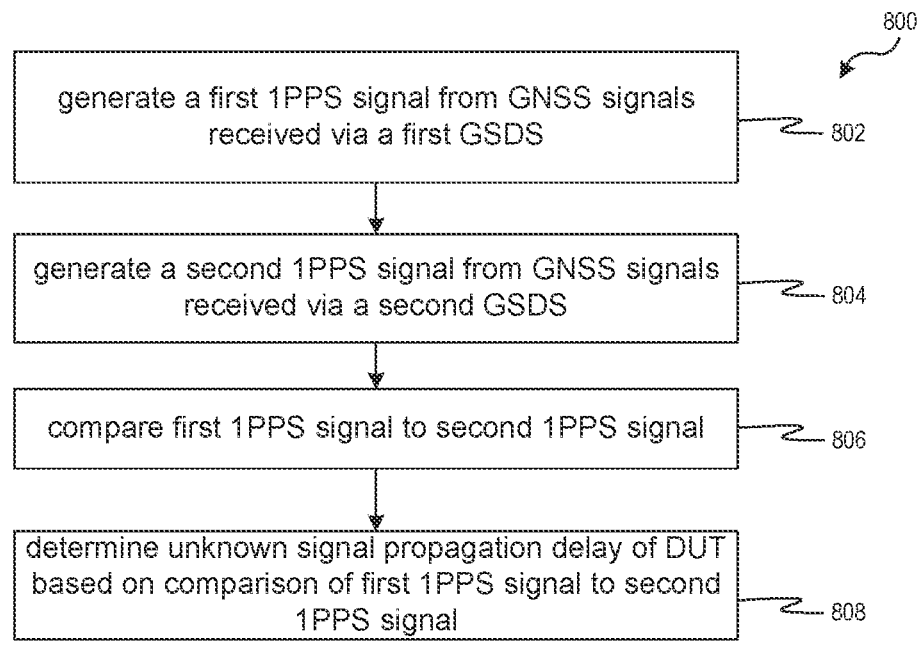
FIGS. 8-9 show methods of detecting propagation delay in a radio access network, according to examples of the present disclosure.

FIG. 8 is a flow chart of a method 800 of determining propagation delay (PD) of a DUT in a RAN, such as 5G RAN 100, according to an example of the present disclosure. The steps of the method 800 are described by way of example as determining the PD of DUT 203, e.g., shown by way of example in FIGS. 2 and 4. It will be apparent to one of ordinary skill in the art the test device 205 may be used for determining the propagation delay of other DUTs in a RAN. The method 800 may be performed by the test device 205 described above. 8

At 802, the test device 205 generates a first 1PPS signal from GNSS signals received via a first GSDS. For example, the test device 205 is connected to DUT 203, and receives GNSS signals via the DUT 203 and generates DUT 1PPS signal 302. As shown in FIG. 6, clock 614 of test device 205 can be tuned to the DUT 1PPS signal 302 to have the same frequency square wave for later comparison.

At 804, the test device 205 generates a second 1PPS signal from GNSS signals received via a second GSDS. For example, the test device 205 is disconnected from DUT 203 and is connected to reference GSDS 211 to receive GNSS signals via reference GSDS 211 and generates reference 1PPS signal 304.

At 806, the first 1PPS signal is compared to the second 1PPS signal. For example, reference 1PPS signal 304 is compared to DUT 1PPS signal 302 such as shown in FIGS. 3 and 6.

At 808, the unknown signal propagation delay of DUT 203 is determined based on the comparison of the first 1PPS signal to the second 1PPS signal. For example, signal PDD, $S_{PDD}$, is calculated by subtracting a time of detection of DUT 1PPS signal 302 $T_{1PPS\ 302}$ from a time of detection of reference 1PPS signal 304 $T_{1PPS\ 304}$ as per EQUATION 1. GNSS total delay $GNSS_{TD}$ of DUT 203 is calculated and, for example, includes the delay of GNSS antenna 130 and the delay of GSDS 132. $GNSS_{TD}$ is calculated by subtracting the total reference PD of reference GSDS 211, $TREF_{PD}$, from the calculated signal PDD $S_{PDD}$ as per EQUATION 3.

At 802, by way of example, the test device 205 is first connected to the DUT 203 to generate DUT 1PPS signal 302, and then the clock 614 is tuned to DUT 1PPS signal 302 to maintain the DUT 1PPS signal 302 for subsequent comparison. Then, the test device 206 is disconnected from DUT 203 and is connected to reference GSDS 211 to receive GNSS signals via reference GSDS 211 and generate reference 1PPS signal 304 for subsequent comparison to DUT 1PPS signal 302 at 806. In another example, the test device 205 is first connected to reference GSDS 211 to receive GNSS signals via reference GSDS 211 and generate reference 1PPS signal 304 at 802. Then, the clock 614 is tuned to reference 1PPS signal 304 to maintain the reference 1PPS signal 304 for subsequent comparison. Then, the test device 206 is disconnected from reference GSDS 211 and is connected to DUT 203 to receive GNSS signals via DUT 203 to generate DUT 1PPS signal 302 at 804 for subsequent comparison to the reference 1PPS signal 304 at 806. In either example, only a single GNSS receiver is needed, for example, GNSS receiver 608, to determine the unknown signal propagation delay of DUT 203 at 808.

Figure 9:
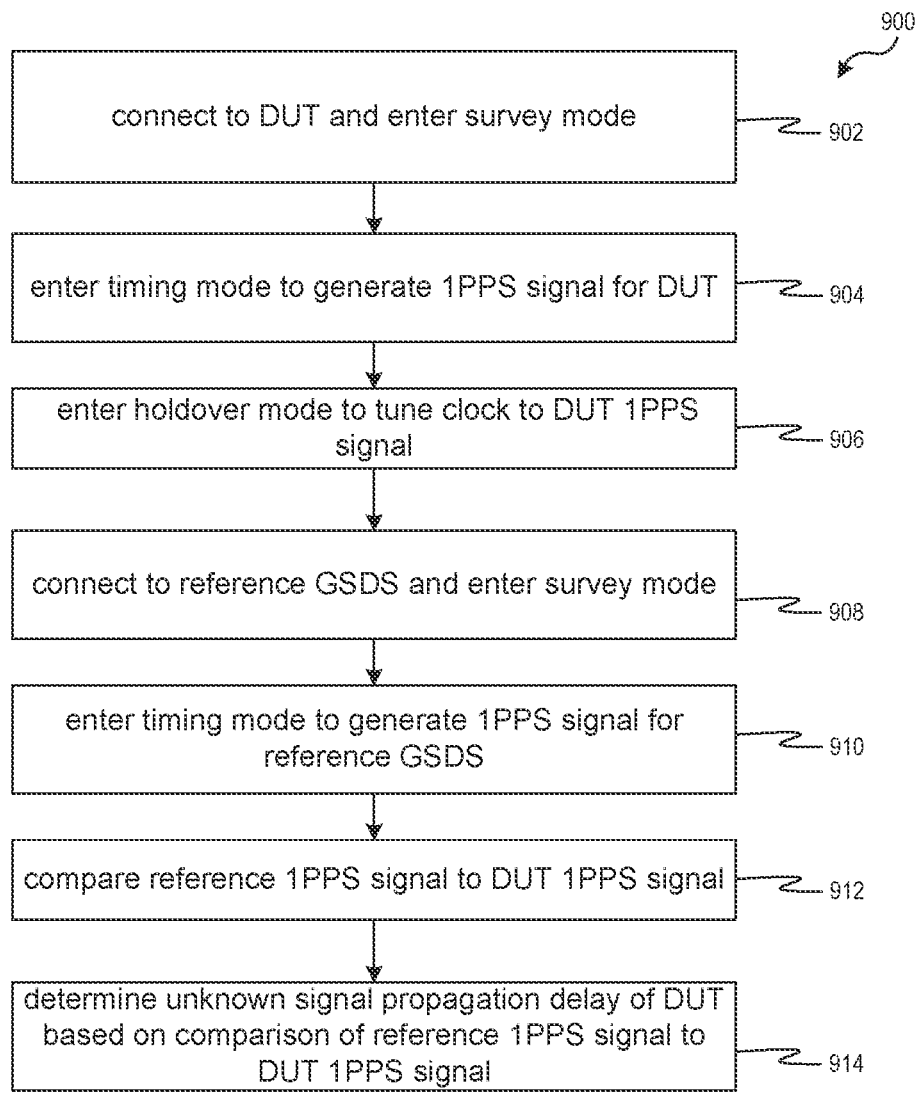

FIG. 9 is a flow chart of another method 900 of determining propagation delay (PD) of a DUT in a RAN, according to an example of the present disclosure. The steps of the method 900 may incorporate the steps of the method 800. The method 900 may be performed by the test device 205 similarly to method 800.

At 902, the test device 205 is connected to DUT 203, and GNSS receiver 608 is placed in survey mode. For example, a GUI may be generated on a display of the test device 205 giving the user an option to place the GNSS receiver 608 in survey mode. The GNSS receiver 608 executes a survey to determine its position and notifies the user, for example, via the display, when the survey is complete. GNSS surveying is the use of GNSS signals via a GNSS receiver and antenna to determine the form, boundary, position of objects or points in space relative to other forms, boundaries or points. Executing the survey accurately determine the position, e.g., longitude, latitude, and altitude, of a GNSS antenna, e.g., GNSS antenna 130, from multiple satellites in order to generate a 1PPS signal. For GNSS surveying, GNSS satellites broadcast messages that enable the user's GNSS receiver to determine the satellites antenna position at the time the signal was broadcast (cartesian X,Y,Z coordinates). To estimate the ground antenna position, the GNSS receiver measures the time delay from at least four satellites, as four unknowns have to be estimated (X, Y, Z and T (receiver clock time)). The result of the survey is an accurate position determination of the GNSS antenna (e.g., GNSS antenna 130, such as within a few meters, and the position determination can be subsequently used to generate an accurate 1PPS signal synchronized to UTC and which can be used for timing and synchronization to UTC in the RAN.

At 904, the GNSS receiver 608 is placed into timing mode after the GNSS survey is complete in order for the GNSS receiver 608 to generate the DUT 1PPS signal 302, such as described with respect to FIG. 5. A GUI may be displayed indicating that the survey is complete and can prompt the user of the test device 205 to enter timing mode. The user may select a particular satellite, such as satellite 110, or satellite constellation, and the GNSS receiver 608 generates DUT 1PPS signal 302 from GNSS signals received from satellite 110 via DUT 203. The DUT 1PPS signal 302 is supposed to be synchronized to UTC but is offset due to the unknown signal PD of DUT 203.

At 906, the GNSS receiver 608 is placed into holdover mode to tune the clock 614 to DUT 1PPS signal 302 so it outputs the DUT 1PPS signal 302 even if the clock 614 is disconnected from the source, such as the 1PPS signal received from the GNSS receiver 608. In an example, a GUI may be displayed including a selectable option for the holdover mode to tune the clock 614 to DUT 1PPS signal 302.

At 908, GNSS receiver 608 is placed in survey mode when connected to reference GSDS 211 while clock 614 maintains DUT 1PPS signal 302. For example, the test device 205 is disconnected from the DUT 203 and connected to reference GSDS 211. The reference GSDS 211, including GNSS antenna 206 and GSDS 208 and interface 209, may be portable and moved to a location where GNSS antenna 206 is not obstructed. The GNSS receiver 608 is placed in survey mode similar to described at 902, which may be responsive to selectable prompts via a GUI. The same satellite 110 (or constellation) selected for the survey at 902 is selected for the survey performed at 908.

At 910, the GNSS receiver 608 is placed into timing mode after the GNSS survey is complete in order for the GNSS receiver 608 to generate reference 1PPS signal 304, similarly as described with respect to 904.

At 912, reference 1PPS signal 304 is compared to DUT 1PPS signal 302, such as described with respect to 806 in FIG. 8.

At 914, the unknown signal propagation delay of DUT 203 is determined based on the comparison of reference 1PPS signal 304 to DUT 1PPS signal 302 such as described with respect to 808 in FIG. 8. The unknown signal propagation delay of DUT 203 may be displayed on the display of test device 205 and may be programmed into GM 122, For example, GNSS total delay $GNSS_{TD}$ of DUT 203 is calculated. For example, $GNSS_{TD}$ is calculated per EQUATION 3 based on $S_{PDD}$ and $TREF_{PD}$. $GNSS_{TD}$ is the offset that is programmed into GM 122 to account for the delay of DUT 203, and thus allows the GM 122 to produce an accurate timing signal such as for 5G services. Also, the PD of reference GSDS 211 is predetermined and stored in the test device 205, and is used to calculate GNSS total delay $GNSS_{TD}$ of DUT 203 as is described above.

In an example, steps of the method 900 are stored as a workflow in test device 205, and the workflow includes GUIs that prompt the user of test device 205 to perform each step. This allows an unexperienced technician to perform the necessary tasks to determine the offset for programming the GM 122. Furthermore, the method 900 describes connecting to DUT 203 first at 902 and then subsequently connecting to reference GSDS 211 at 908. In another example, the method 900 may connect to reference GSDS 211 at 902 and then subsequently connecting to DUT 203 at 908.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A test device for determining Global Navigation Satellite System (GNSS) signal propagation delay in a GNSS signal distribution system (GSDS) for a radio access network, comprising:
    a GNSS receiver to:
        receive a first GNSS signal when connected to a reference GSDS, wherein the reference GSDS has a known signal propagation delay;
        generate a first one pulse per second (1PPS) signal from the first GNSS signal received from the reference GSDS;
        receive a second GNSS signal when connected to a device under test (DUT), including a second GSDS having an unknown signal propagation delay, instead of the reference GSDS; and
        generate a second 1PPS signal from the second GNSS signal received from the DUT;
    a clock tunable to the first 1PPS signal or the second 1PPS signal;
    a processor to:
        compare the first 1PPS signal to the second 1PPS signal; and
        determine the unknown signal propagation delay of the DUT based on the comparison of the first 1PPS signal to the second 1PPS signal.

2. The test device according to claim 1, wherein to determine the unknown signal propagation delay the processor is to:
    determine a time of detection of the first 1PPS signal;
    determine a time of detection of the second 1PPS signal;
    calculate a signal propagation delay difference by subtracting the time of detection of the first 1PPS signal from the time of detection of the second 1PPS signal; and
    calculate the unknown signal propagation delay of the DUT by adding the signal propagation delay difference to the known signal propagation delay of the reference GSDS.

3. The test device according to claim 2, wherein to determine a time of detection of the first 1PPS signal and the second 1PPS signal, the processor is to:
    detect when a leading edge of the first 1PPS signal and a leading edge of the second 1PPS signal reach a threshold voltage.

4. The test device according to claim 1, wherein to compare the first 1PPS signal to the second 1PPS signal, the processor is to:
    receive one of the first 1PPS signal or the second 1PPS signal from the clock;
    receive another one of the first 1PPS signal or the second 1PPS signal from the GNSS receiver; and
    compare the received first 1PPS signal and the second 1PPS signal to determine the unknown signal propagation delay of the DUT.

5. The test device of claim 4, wherein the clock is tuned to the one of the first 1PPS signal or the second 1PPS signal prior to the GNSS receiver generating the another one of the first 1PPS signal or the second 1PPS signal.

6. The test device according to claim 1, wherein the second GSDS includes a first radio frequency (RF) cable communicatively coupled to a GNSS antenna of the second GSDS and to an RF element and a second RF cable communicatively coupled to the RF element and a connectable interface.

7. The test device according to claim 6, wherein the RF element is one of a surge arrestor or a Global Positioning System (GPS) splitter.

8. The test device according to claim 1, wherein the second GSDS includes a first RF cable communicatively coupled to a GNSS antenna of the second GSDS and an optical fiber and a second RE cable communicatively coupled to the optical fiber and a connectable interface.

9. The test device according to claim 8, wherein the first RF cable is communicatively coupled to the optical fiber with a first GPS over Fiber interface, and the second RE cable is communicatively coupled to the optical fiber with a second GPS over Fiber interface.

10. The test device according to claim 9, wherein the first RF cable is communicatively coupled to an in-line active or passive RF element.

11. The test device according to claim 1, wherein the test device is a portable device for conducting field measurements in the radio access network, the test device further comprising:
    a battery module to supply power during measurements.

12. A method of determining Global Navigation Satellite System (GNSS) signal propagation delay in a GNSS signal distribution system (GSDS) for a radio access network, the method comprising:
    receiving, by a test device, a first GNSS signal from a first GSDS, wherein the first GSDS comprises one of a DUT with unknown propagation delay or a reference GSDS having a known propagation delay;
    generating a first one pulse per second (1PPS) signal from the first GNSS signal;
    tuning a clock to the first 1PPS signal;
    receiving, by the test device, a second GNSS signal from a second GSDS, wherein the second GNSS comprises another one of the DUT with unknown propagation delay or the reference GSDS having a known propagation delay;
    generating a second 1PPS signal from the second GNSS signal;
    comparing the first 1PPS signal to the second 1PPS signal; and
    determining the unknown propagation delay of the DUT based on the comparison of the first 1PPS signal to the second 1PPS signal.

13. The method according to claim 12, wherein the clock is tuned to the first 1PPS signal prior to receiving the second GNSS signal.

14. The method according to claim 12, wherein the first and second 1PPS signals are generated by a GNSS receiver of the test device.

15. The method according to claim 12, wherein determining the unknown propagation delay of the DUT comprises:
    determining a time of detection of the first 1PPS signal;
    determining a time of detection of the second 1PPS signal;
    calculating a signal propagation delay difference by subtracting the time of detection of the first 1PPS signal from the time of detection of the second 1PPS signal; and calculating the unknown propagation delay of the DUT by adding the signal propagation delay difference to the known propagation delay of the reference GSDS.

16. The method according to claim 15, wherein determining a time of detection of the first 1PPS signal and the second 1PPS signal comprises:
   detecting when a leading edge of the first 1PPS signal and a leading edge of the second 1PPS signal reach a threshold voltage.

17. The method of claim 12, wherein generating the first 1PPS signal and the second 1PPS signal comprises:
   placing a GNSS receiver of the test device into survey mode to calculate a first position in terms of longitude, latitude and altitude of the GNSS receiver when the test device is connected to the one of DUT or the reference GSDS;
   calculating the first 1PPS signal based on the first position, wherein the clock is tuned to calculated 1PPS signal;
   placing the GNSS receiver of the test device into the survey mode to calculate a second position in terms of longitude, latitude and altitude of the GNSS receiver when the test device is connected to the another one of DUT or the reference GSDS; and
   calculating the second 1PPS signal based on the second position.

18. A portable field test device for determining Global Navigation Satellite System (GNSS) signal propagation delay in a GNSS signal distribution system (GSDS) for a radio access network, comprising:
   a battery module connected to one or more memories and a processor to supply power during field measurements;
   a GNSS receiver to:
      receive a first GNSS signal when connected to a reference GSDS, wherein the reference GSDS has a known signal propagation delay;
      generate a first one pulse per second (1PPS) signal from the first GNSS signal received from the reference GSDS;
      receive a second GNSS signal when connected to a device under test (DUT), including a second GSDS having an unknown signal propagation delay, instead of the reference GSDS; and
      generate a second 1PPS signal from the second GNSS signal received from the DUT;
   a clock tunable to the first 1PPS signal or the second 1PPS signal;
   the processor to:
      compare the first 1PPS signal to the second 1PPS signal; and
      determine the unknown signal propagation delay of the DUT based on the comparison of the first 1PPS signal to the second 1PPS signal.

19. The portable field test device according to claim 18, wherein to determine the unknown signal propagation delay of the DUT, the processor is to:
   add a signal propagation delay difference to the known signal propagation delay of the reference GSDS to determine the unknown signal propagation delay of the DUT.

20. The portable field test device according to claim 18, wherein the DUT comprises cables and in-line RF elements.

* * * * *